US011333565B2

(12) United States Patent
Son et al.

(10) Patent No.: US 11,333,565 B2
(45) Date of Patent: May 17, 2022

(54) SENSING DEVICE THAT ALLOWS A COUPLING FORCE TO BE INCREASED

(71) Applicant: LG INNOTEK CO., LTD., Seoul (KR)

(72) Inventors: Ho Chan Son, Seoul (KR); Se Ho Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 16/960,432

(22) PCT Filed: Nov. 12, 2018

(86) PCT No.: PCT/KR2018/013682
§ 371 (c)(1),
(2) Date: Jul. 7, 2020

(87) PCT Pub. No.: WO2019/139240
PCT Pub. Date: Jul. 18, 2019

(65) Prior Publication Data
US 2020/0348196 A1 Nov. 5, 2020

(30) Foreign Application Priority Data

Jan. 9, 2018 (KR) .................. 10-2018-0002926
Jan. 10, 2018 (KR) .................. 10-2018-0003436

(51) Int. Cl.
*G01L 5/22* (2006.01)
*B62D 6/10* (2006.01)

(52) U.S. Cl.
CPC ............... *G01L 5/221* (2013.01); *B62D 6/10* (2013.01)

(58) Field of Classification Search
CPC . H02K 11/33; H02K 5/10; H02K 5/22; H02K 5/225; G01L 5/221; B62D 6/10
USPC ..................................................... 73/862.193
See application file for complete search history.

(56) References Cited

U.S. PATENT DOCUMENTS

| 9,400,290 | B2* | 7/2016 | Lee .................... G01L 3/104 |
| 10,161,815 | B2* | 12/2018 | Lee .................... B62D 6/10 |
| 10,739,215 | B2* | 8/2020 | Lee .................... G01L 5/22 |
| 2015/0090051 | A1 | 4/2015 | Lee |
| 2016/0214648 | A1* | 7/2016 | Schoepe ................ G01D 5/145 |
| 2016/0238471 | A1* | 8/2016 | Son .................... G01L 3/104 |
| 2017/0052077 | A1 | 2/2017 | Lee |

(Continued)

FOREIGN PATENT DOCUMENTS

| CN | 106468607 A | 3/2017 |
| KR | 10-2011-0008508 A | 1/2011 |
| KR | 10-2015-0034982 A | 4/2015 |

(Continued)

*Primary Examiner* — Octavia Hollington
(74) *Attorney, Agent, or Firm* — Birch, Stewart, Kolasch & Birch, LLP

(57) ABSTRACT

An embodiment may provide a sensing device comprising: a rotor; a stator disposed outside the rotor; and a sensor module disposed outside the stator, wherein the rotor includes a rotor holder, and a magnet and a sleeve which are coupled to the rotor holder, wherein the magnet includes a first body and a first protrusion protruding in an axis direction from the first body, the sleeve includes a second body and a second protrusion protruding outward from the second body, and the rotor holder includes a first groove in which the first protrusion is disposed.

20 Claims, 16 Drawing Sheets

(56) References Cited

U.S. PATENT DOCUMENTS

2017/0254710 A1   9/2017   Lee et al.

FOREIGN PATENT DOCUMENTS

| KR | 10-1584913 B1   | 1/2016 |
| KR | 10-2017-0022377 A | 3/2017 |
| KR | 10-2018-0001411 A | 1/2018 |

* cited by examiner

[FIG. 1]
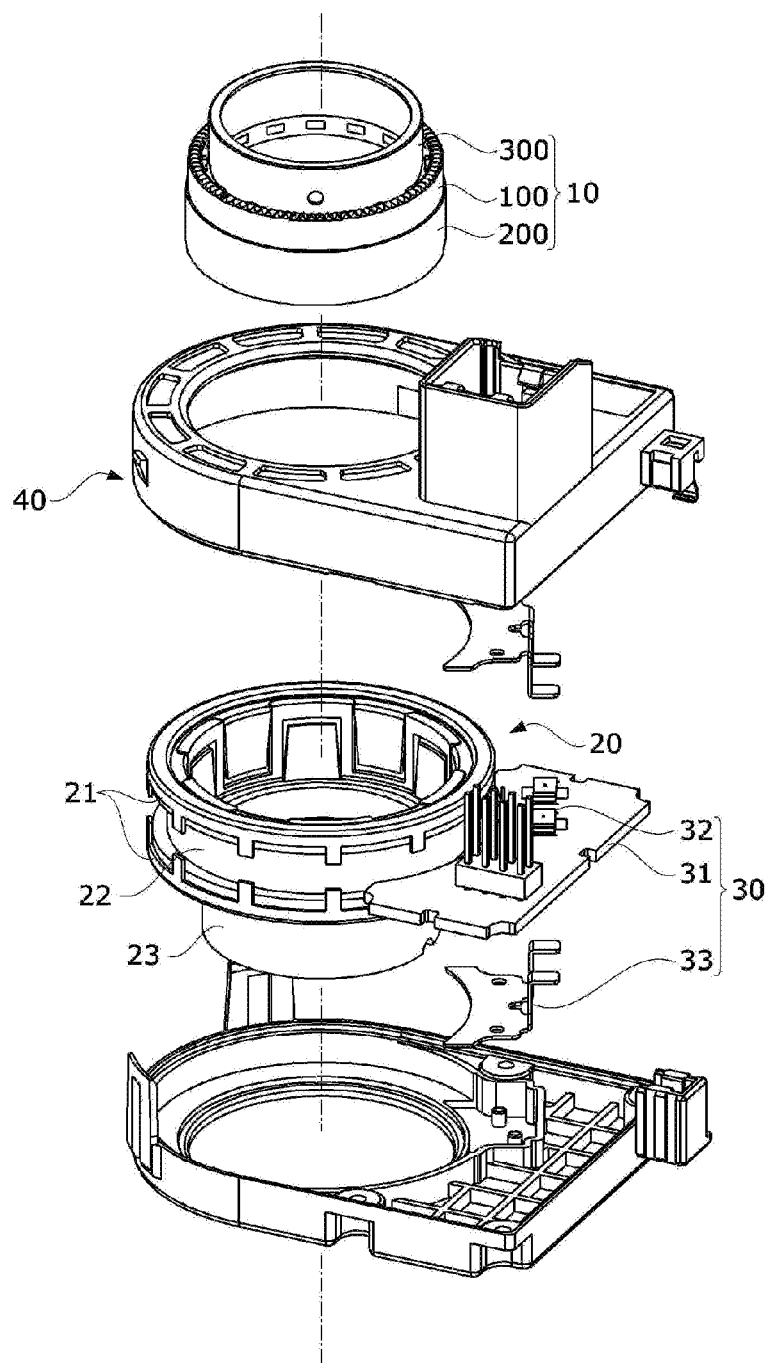

[FIG. 2]
10
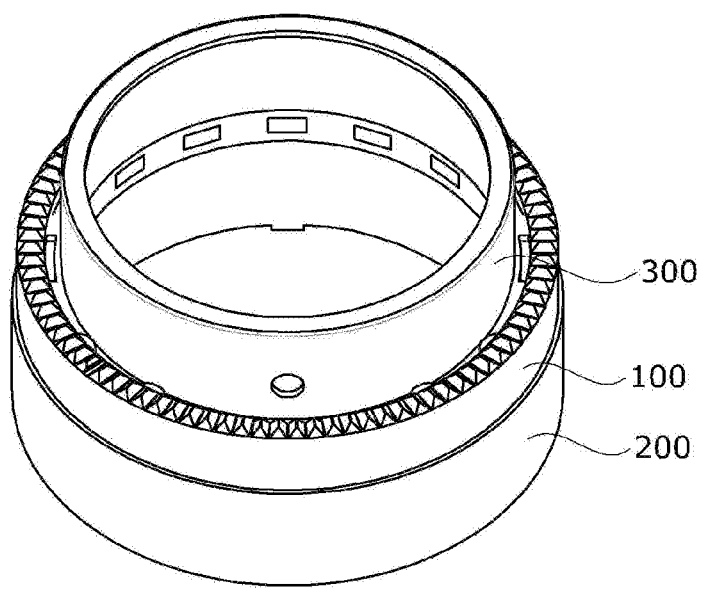

[FIG. 3]
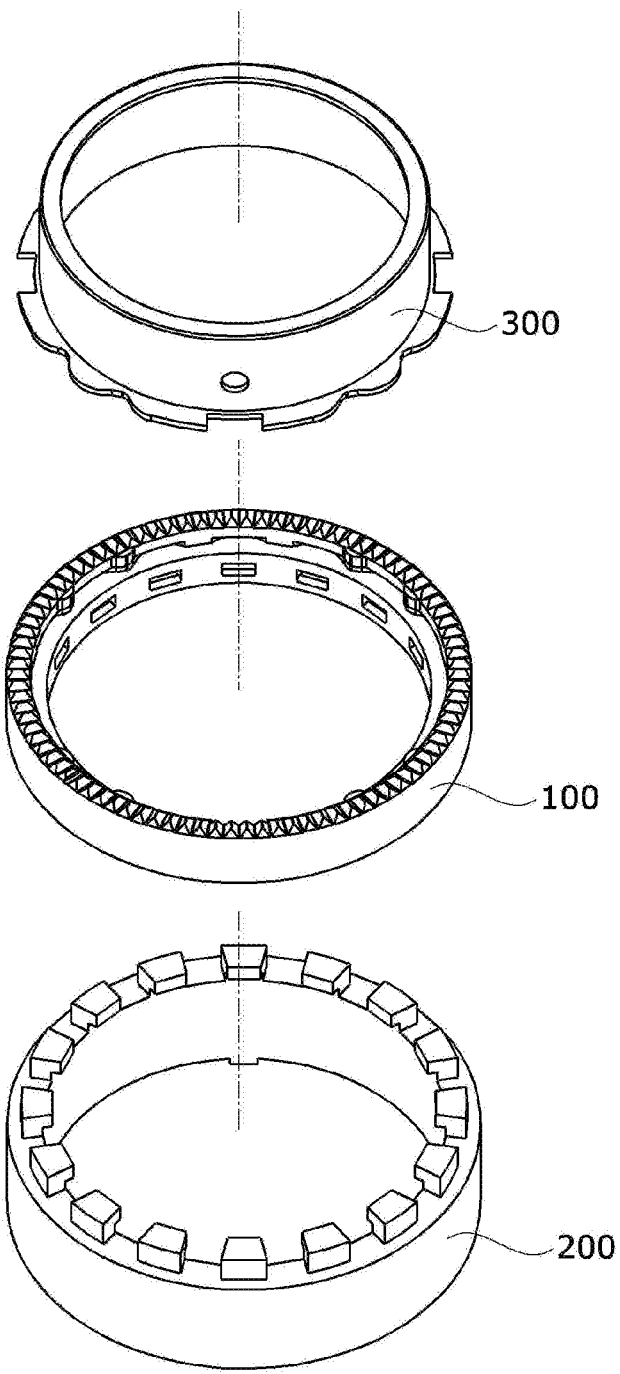

[FIG. 4]
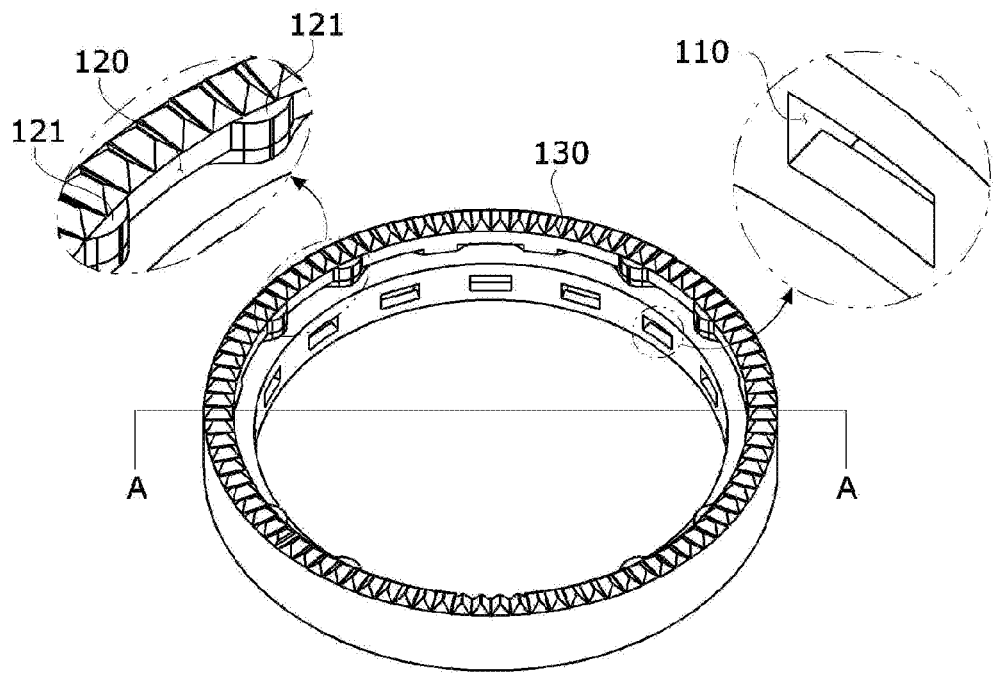
[FIG. 5]
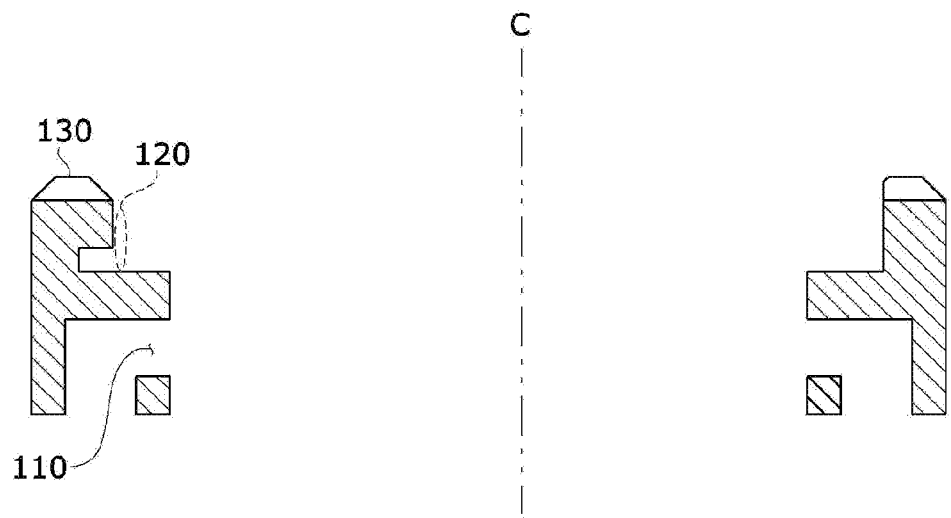

[FIG. 6]
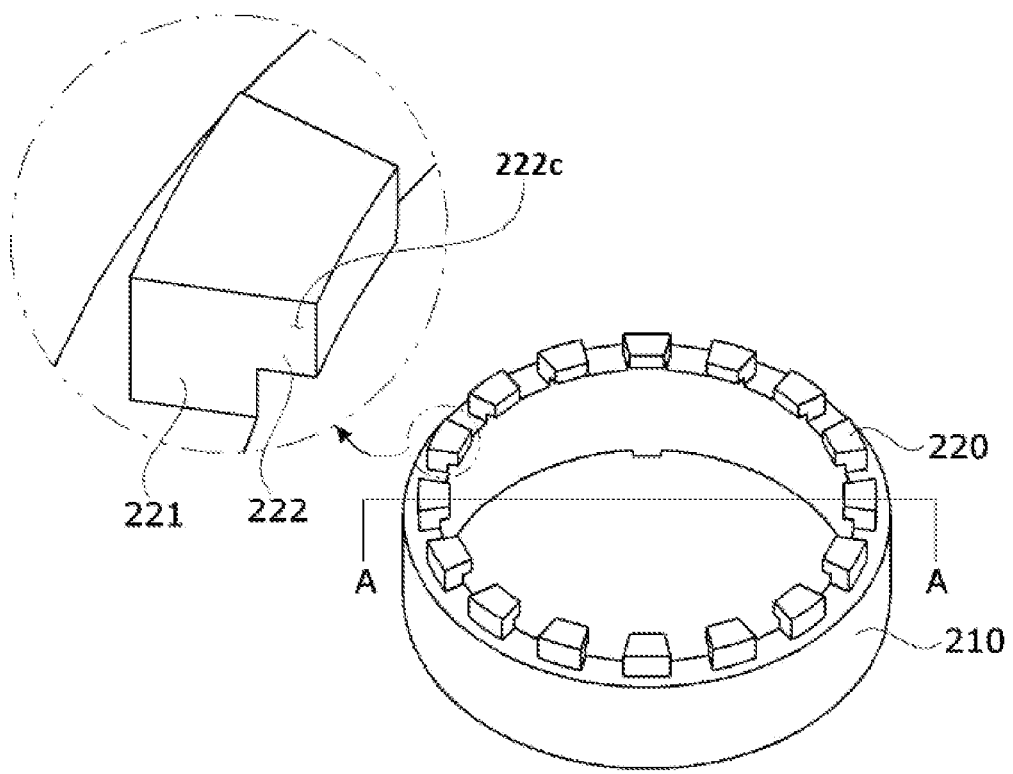

[FIG. 7]
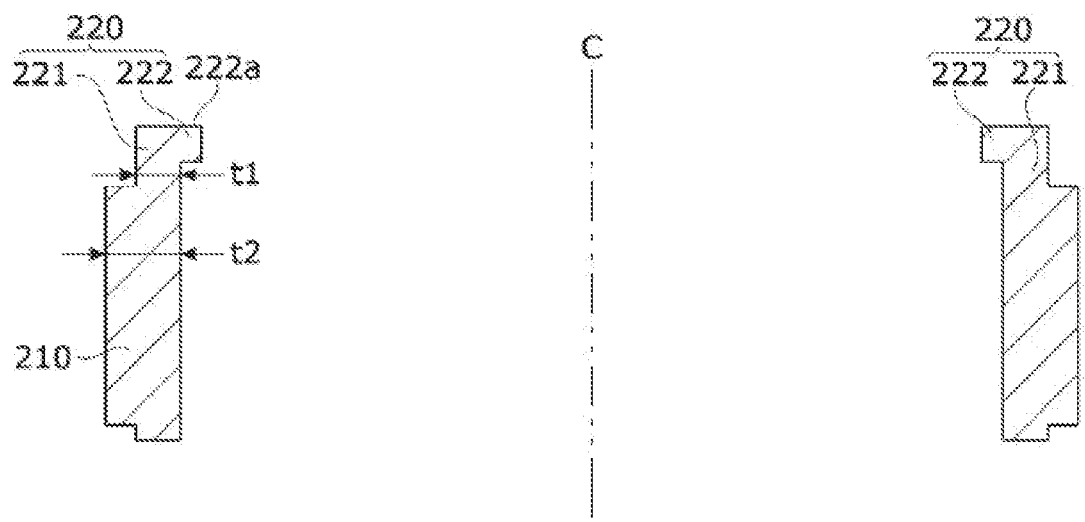

[FIG. 8]
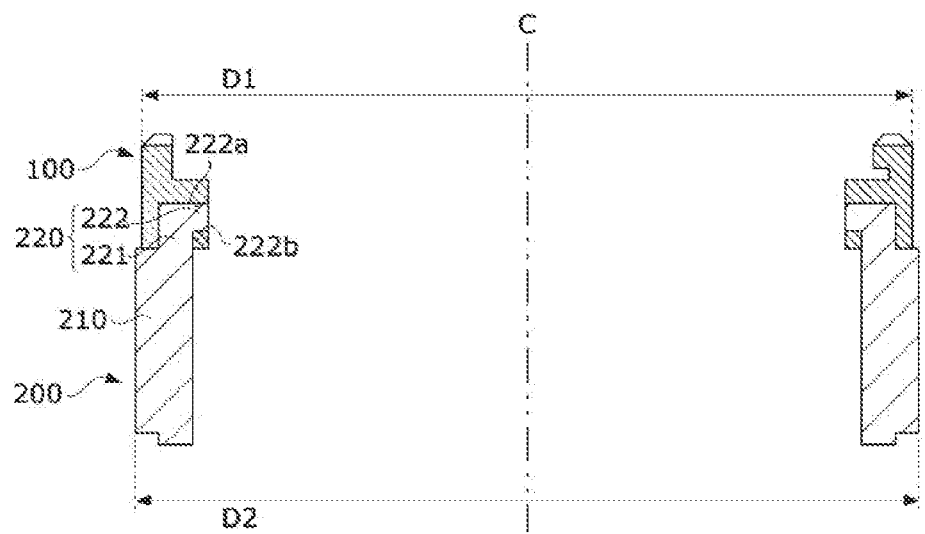
[FIG. 9]
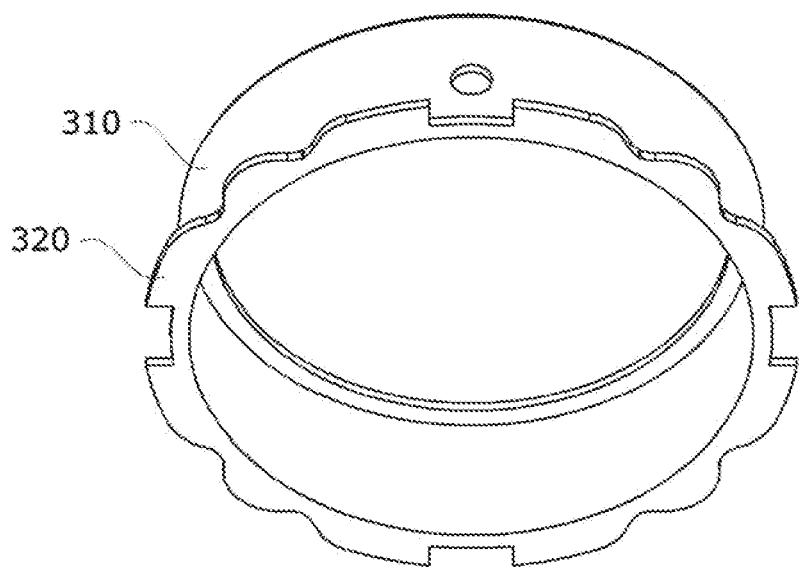

[FIG. 10]
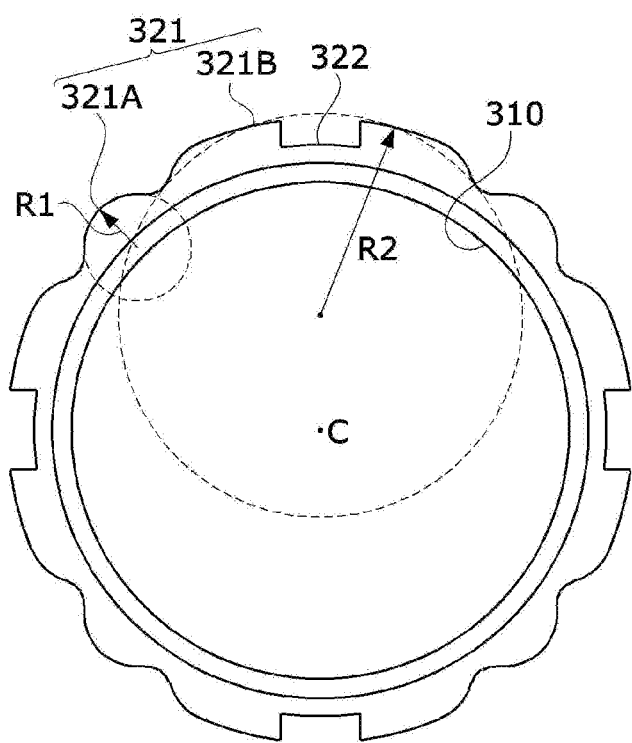

[FIG. 11]
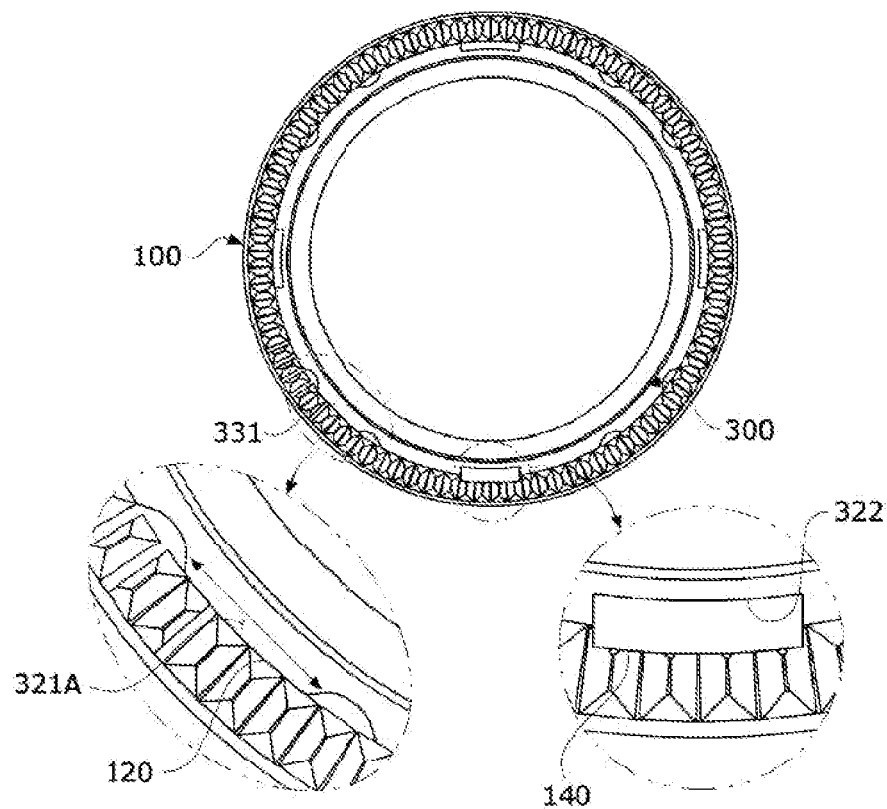

[FIG. 12]
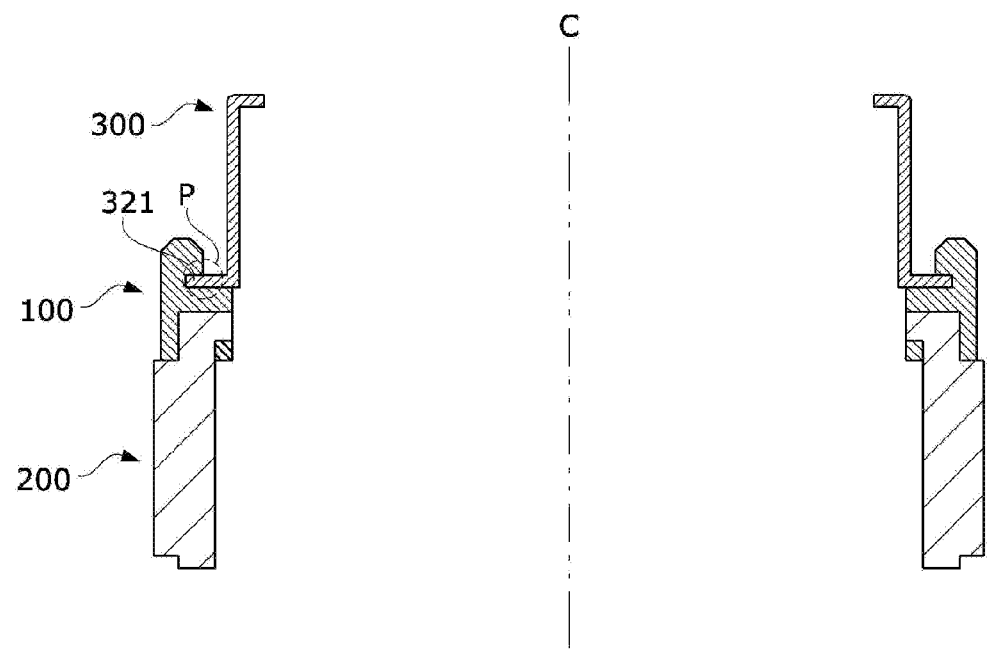

[FIG. 13]
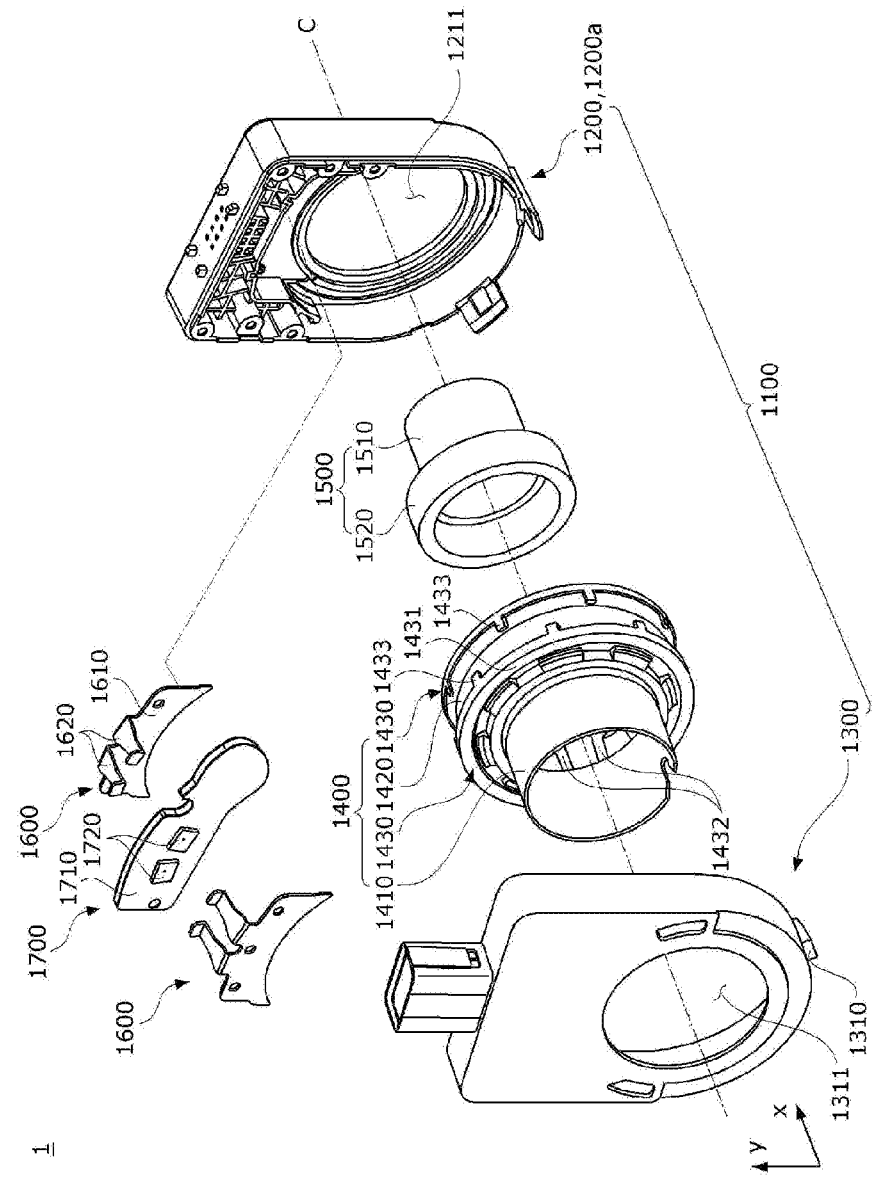

[FIG. 14]
1200
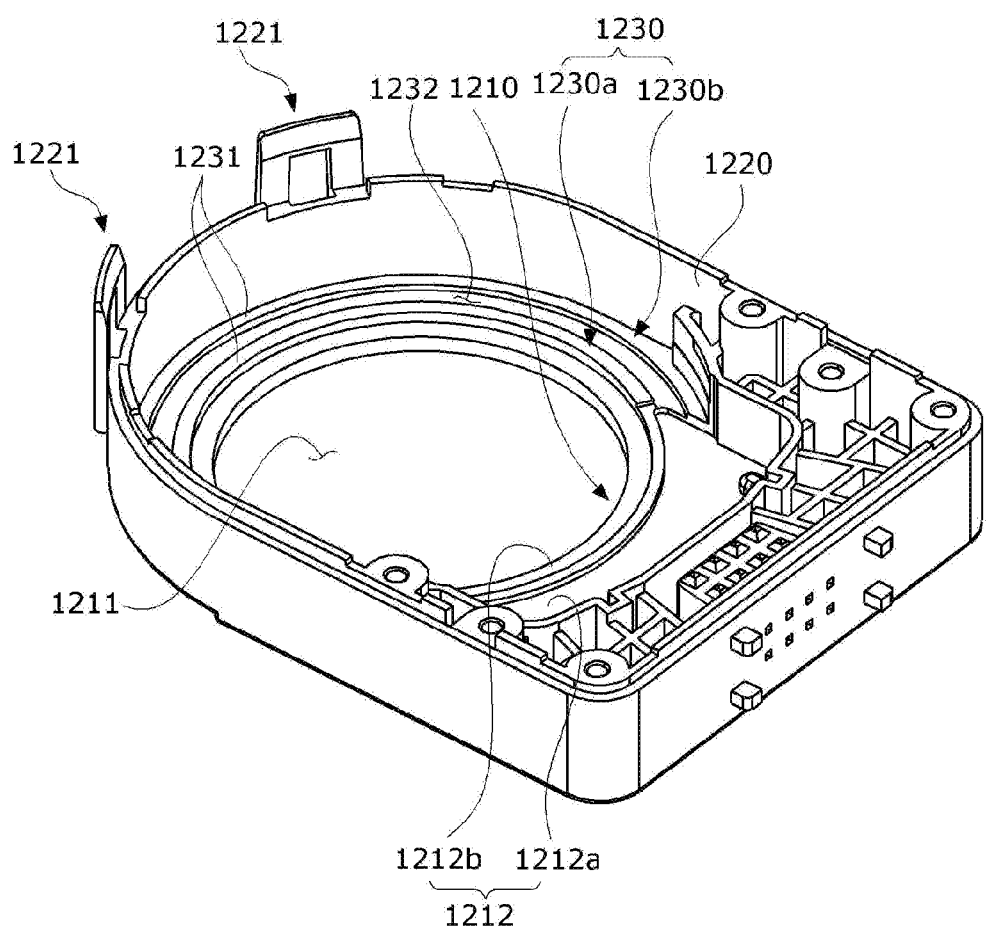

[FIG. 15]
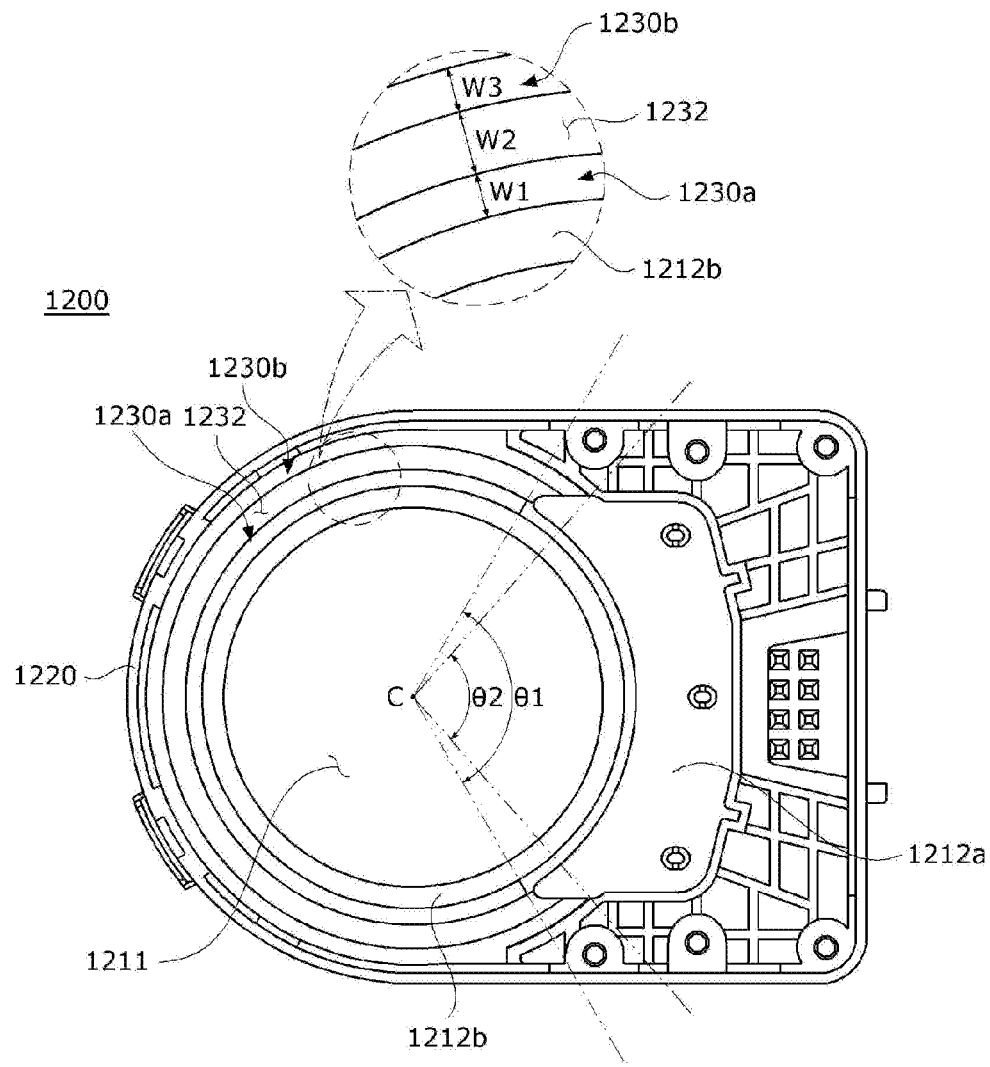

[FIG. 16]
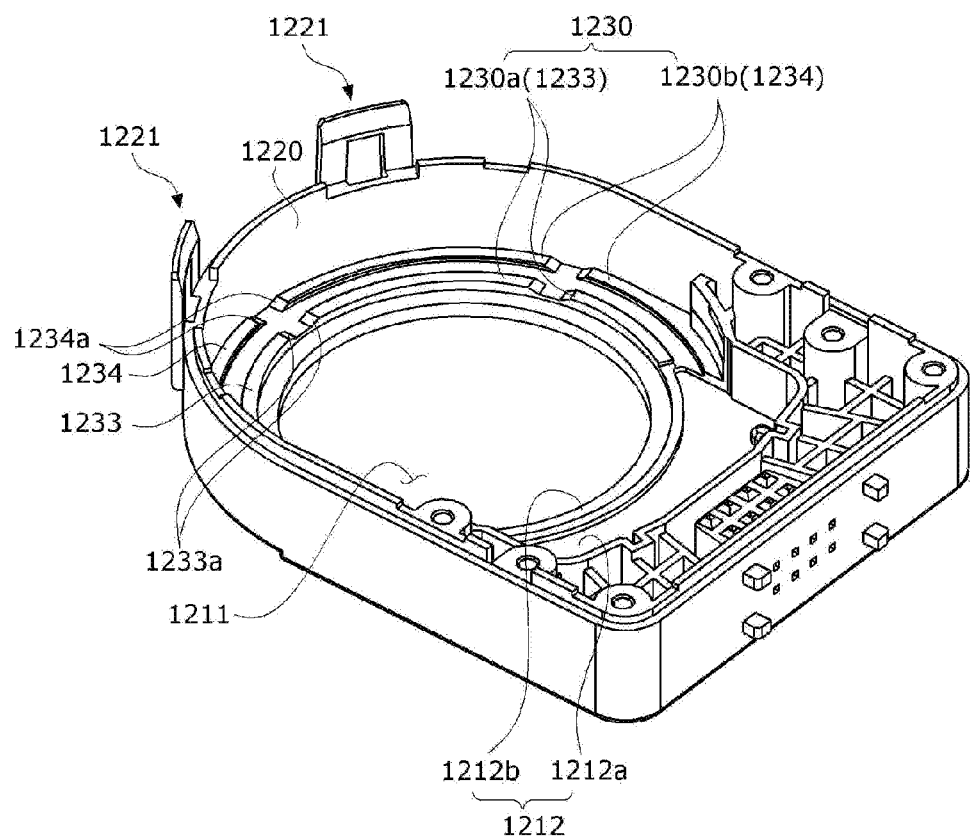

[FIG. 17]
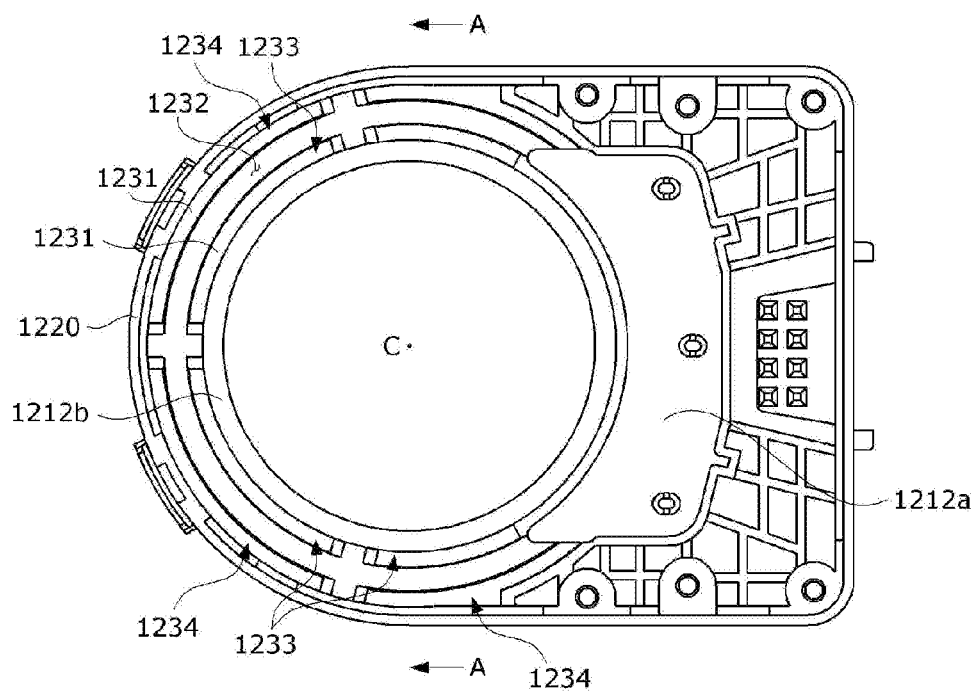

[FIG. 18]
1200a
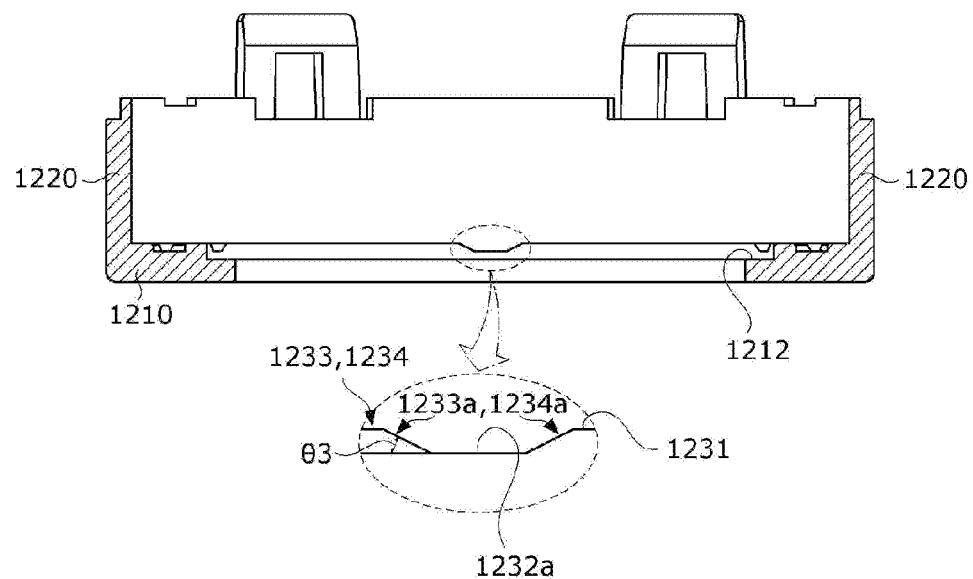

SENSING DEVICE THAT ALLOWS A COUPLING FORCE TO BE INCREASED

CROSS REFERENCE TO RELATED APPLICATIONS

This application is the National Phase of PCT International Application No. PCT/KR2018/013682, filed on Nov. 12, 2018, which claims priority under 35 U.S.C. 119(a) to Patent Application Nos. 10-2018-0002926, filed in the Republic of Korea on Jan. 9, 2018 and 10-2018-0003436, filed in the Republic of Korea on Jan. 10, 2018, all of which are hereby expressly incorporated by reference into the present application.

TECHNICAL FIELD

The present invention relates to a sensing device.

BACKGROUND ART

In an electronic power steering (EPS) system, an electronic control unit drives a motor according to driving conditions to secure turning stability and provide quick reinforcing force so that a driver can stably travel.

A torque sensor, an angle sensor, or a torque angle sensor may include a rotor and a stator. The rotor includes a sleeve connected to a steering shaft of a vehicle. A rotor holder formed of a metal material and having a pipe shape is provided outside the sleeve. A magnet is attached to an outer circumferential surface of the rotor holder using an adhesive. In a case in which the adhesive is used to attach the magnet, there is a problem in that cracks may occur in a surface of the magnet in a high temperature condition due to a difference in heat expansion between the magnet and the rotor holder.

In addition, the sensing device may include a housing, the rotor, the stator, and a collector.

In this case, one surface of the stator is in surface contact with a lower surface of the housing. Accordingly, there is a problem in that noise is generated due the surface contact when the stator is rotated.

In addition, in a case in which a gap is minimized by increasing an amount of surface contact between the stator and the housing to induce functional stability of the sensing device, there is a problem in that noise is further increased.

In addition, there is a problem in that noise is increased due to a material difference between a stator ring of the stator and the housing.

Technical Problem

The present invention is directed to providing a sensing device which allows a coupling force to be increased between a rotor holder and a magnet without using an adhesive, a manufacturing process to be simplified, and the number of components to be decreased.

In addition, the present invention is directed to providing a sensing device which allows an amount of surface contact between a stator and a housing to be decreased so as to decrease noise.

Objectives that should be solved according to embodiments are not limited to the above described objectives, and other objectives which are not described above will be clearly understood by those skilled in the art from the following specification.

Technical Solution

One aspect of the present invention provides a sensing device including a rotor, a stator disposed outside the rotor, and a sensor module disposed outside the stator, wherein the rotor includes a rotor holder and a magnet and a sleeve which are coupled to the rotor holder, the magnet includes a first body and a first protrusion protruding from the first body in an axial direction, the sleeve includes a second body and a second protrusion protruding outward from the second body, and the rotor holder includes a first groove in which the first protrusion is disposed.

The first protrusion may include a first-first protrusion extending upward from an upper surface of the magnet, and a first-second protrusion protruding perpendicularly from the first-first protrusion.

A thickness of the first-first protrusion may be less than a thickness of the first body of the magnet in a radius direction of the magnet.

The rotor holder may surround an upper surface, a lower surface, and a side surface of the first-second protrusion.

A front surface of the first-second protrusion facing a center of the magnet may be externally exposed.

A distance from an outer circumferential surface of the rotor holder to a center of the magnet may be less than a distance from an outer circumferential surface of the magnet to the center of the magnet.

The first protrusion may include a plurality of convex portions, and the plurality of convex portions may include a first convex portion and a second convex portion of which curvatures are different.

The curvature of the first convex portion may be less than the curvature of the second convex portion.

The second convex portion may include a concave portion concavely formed to have a rectangular shape in an outer surface of the second convex portion.

The concave portion may be disposed as a plurality of concave portions, and the plurality of the concave portions may be rotationally symmetrically disposed with respect to a center of the body.

A part of the rotor holder may be disposed on an upper surface of a convex portion.

The rotor holder may include a serration part formed on an upper surface of the rotor holder.

The rotor holder may include a second groove in which the first protrusion is disposed, the first groove may have a shape corresponding to a shape of the first protrusion, and the second groove may have a shape corresponding to a shape of the second protrusion.

The sleeve and the magnet may be coupled using the rotor holder, and the rotor holder may be an injection molding part.

The sleeve may be coupled to an upper side of the rotor holder, and the magnet may be coupled to a lower side of the rotor holder.

The sleeve and the magnet may be disposed to be spaced apart from each other in the axial direction.

Another aspect of the present invention provides a sensing device including a rotor, a stator disposed outside the rotor, and a sensor module disposed outside the stator, wherein the rotor includes a rotor holder and a magnet and a sleeve which are coupled to the rotor holder, the magnet includes a first body and a first protrusion protruding from the first body in an axial direction, the sleeve includes a second body and a second protrusion protruding outward from the second body, and the first protrusion is inserted into the rotor holder.

Still another aspect of the present invention provides a sensing device including a housing including a first housing and a second housing, a stator disposed inside the housing, a collector disposed close to the stator, and a rotor disposed inside the stator, whereon the first housing includes a main body and a protruding portion protruding from an inner surface of the main body, and the protruding portion includes contact surfaces in contact with one surface of the stator and a groove disposed between the contact surfaces.

In addition, the protruding portion may include a first protruding portion and a second protruding portion disposed outside the first protruding portion, and the groove may be disposed between the first protruding portion and the second protruding portion.

The inner surface may include a first surface and a second surface, and one region of the first surface on which the collector is disposed may be disposed between one side end and the other side end of the second protruding portion.

A first angle (θ1) may be formed between one side end and the other side end of the first protruding portion about a center (C) of the stator, a second angle (θ2) may be formed between the one side end and the other side end of the second protruding portion about the center (C) of the stator, and the second angle (θ2) may be less than the first angle (θ1).

Meanwhile, a width of the groove may be 20 to 30% of the sum of a width (W1) of a contact surface of the first protruding portion, the width (W2) of the groove, and a width (W3) of a contact surface of the second protruding portion.

In addition, the width (W2) of the groove may be 0.50 to 0.86 times the width (W1) of the first protruding portion.

The width (W1) of the first protruding portion may be the same as the width (W3) of the second protruding portion.

Meanwhile, each of the first protruding portion and the second protruding portion may be formed to have a "C" shape.

In addition, each of the first protruding portion and the second protruding portion may include a plurality of protrusions disposed to be spaced apart from each other in a circumferential direction thereof.

An inclined surface may be obliquely formed on one end of the protrusion with respect to a lower surface of the groove.

The protrusion may be formed to have an arc shape when viewed from above.

Meanwhile, the sensing device may further include a lubrication member disposed on the contact surface.

The stator may include a stator yoke, a holder connected to the stator yoke, and a pair of stator rings disposed to cover a part of an outer surface of the holder, and one region of the stator ring may be in surface contact with the contact surface.

Advantageous Effects

According to embodiments, an advantageous effect is provided in that a coupling force of a magnet and a rotor holder of a rotor is increased.

An advantageous effect is provided in that a sleeve is prevented from vertical moving and rotating.

A sensing device according to the embodiment can decrease an amount of surface contact between a stator and a housing to reduce noise. The amount of surface contact can be minimized using at least two protruding portions and a groove to reduce the noise.

In addition, since the stator is supported by two protruding portions disposed to be spaced apart from each other, movement of the stator can be minimized when the stator is rotated.

Useful advantages and effects of the embodiments are not limited to the above-described contents and will be more easily understood from descriptions of the specific embodiments.

DESCRIPTION OF DRAWINGS

FIG. 1 is a view illustrating a sensing device according to an embodiment.

FIG. 2 is a perspective view illustrating a rotor.

FIG. 3 is an exploded view illustrating the rotor illustrated in FIG. 2.

FIG. 4 is a perspective view illustrating a rotor holder illustrated in FIG. 1.

FIG. 5 is a side cross-sectional view illustrating the rotor holder taken along line A-A of FIG. 4.

FIG. 6 is a perspective view illustrating a magnet.

FIG. 7 is a cross-sectional view illustrating the magnet taken along line B-B of FIG. 6.

FIG. 8 is a view illustrating a coupling state of the magnet and the rotor holder.

FIG. 9 is a view illustrating a sleeve.

FIG. 10 is a bottom view illustrating a convex portion of the sleeve.

FIG. 11 is a view illustrating a state in which a first convex portion is engaged with a second groove.

FIG. 12 is a view illustrating a state in which the rotor holder, the magnet, and the sleeve are coupled.

FIG. 13 is an exploded perspective view illustrating a sensing device according to an embodiment.

FIG. 14 is a perspective view illustrating a first example of a first housing of the sensing device according to the embodiment.

FIG. 15 is a plan view illustrating the first example of the first housing of the sensing device according to the embodiment.

FIG. 16 is a perspective view illustrating a second example of the first housing of the sensing device according to the embodiment.

FIG. 17 is a plan view illustrating the second example of the first housing of the sensing device according to the embodiment.

FIG. 18 is a cross-sectional view taken along line A-A of FIG. 17.

MODES OF THE INVENTION

Hereinafter, exemplary embodiments of the present invention will be described in detail with reference to the accompanying drawings.

However, the technical spirit of the present invention is not limited to some embodiments which will be described and may be realized using various other embodiments, and at least one component of the embodiments may be selectively coupled, substituted, and used to realize the technical spirit within the range of the technical spirit.

In addition, unless clearly and specifically defined otherwise, all terms (including technical and scientific terms) used herein can be interpreted as having customary meanings to those skilled in the art, and meanings of generally used terms, such as those defined in commonly used dictionaries, will be interpreted by considering contextual meanings of the related technology.

In addition, the terms used in the embodiments of the present invention are considered in a descriptive sense and not to limit the present invention.

In the present specification, unless clearly indicated otherwise by the context, singular forms include the plural forms thereof, and in a case in which "at least one (or one or more) among A, B, and C" is described, this may include at least one combination among all combinations which can be combined with A, B, and C.

In addition, in descriptions of components of the present invention, terms such as "first," "second," "A," "B," "(a)," and "(b)" can be used.

The terms are only to distinguish one element from another element, and an essence, order, and the like of the element are not limited by the terms.

In addition, it should be understood that, when an element is referred to as being "connected or coupled" to another element, such a description may include both a case in which the element is directly connected or coupled to another element, and a case in which the element is connected or coupled to another element with still another element disposed therebetween.

In addition, in a case in which any one element is described as being formed or disposed "on or under" another element, such a description includes both a case in which the two elements are formed or disposed in direct contact with each other and a case in which one or more other elements are interposed between the two elements. In addition, when one element is described as being disposed "on or under" another element, such a description may include a case in which the one element is disposed at an upper side or a lower side with respect to another element.

Hereinafter, example embodiments of the invention will be described in detail with reference to the accompanying drawings. Components that are the same or correspond to each other will be denoted by the same reference numerals regardless of the figure numbers, and redundant descriptions will be omitted.

FIG. 1 is a view illustrating a sensing device according to an embodiment.

Referring to FIG. 1, the sensing device may include a rotor 10, a stator 20, and a sensor module 30.

The rotor 10 is disposed inside the stator 20. The rotor 10 is connected to an input shaft of a steering shaft. In this case, the input shaft may be a steering shaft connected to a handle of a vehicle. The rotor 10 may include a rotor holder 100, a magnet 200, and a sleeve 300. The input shaft is inserted into the sleeve 300.

The stator 20 is disposed outside the rotor 10. The stator 20 may include stator teeth 21 having an annular shape, a mold member 22, and a holder 23. A pair of stator teeth 21 may be disposed to face and be separated from each other. In addition, two stator teeth 21 may be fixed on and under the mold member 22. The holder 23 is coupled to the mold member 22. The holder 23 may be connected to an output shaft of the steering shaft. In this case, the output shaft may be a steering shaft connected to a power transmission structure at a side of a wheel. Accordingly, the stator 20 is connected to and rotated with the output shaft.

The sensor module 30 measures a magnetic field generated between the rotor 10 and the stator 20. The sensor module 30 may include a circuit board 31 and a Hall sensor 32 mounted on the circuit board 31. In addition, the sensor module 30 may include collectors 33. Torsion occurs at a torsion bar disposed between the input shaft and the output shaft due to a difference in amount of rotation between the input shaft and the output shaft, and when the torsion occurs, an amount of rotation of the magnet 200 of the rotor 10 is different from an amount of rotation of the stator 20. Accordingly, surfaces of the first magnet 200 and the stator 20 facing each other are changed so that an amount of magnetization is changed. The Hall sensor 32 may detect the change in amount of magnetization to measure a torque applied to the steering shaft.

FIG. 2 is a perspective view illustrating the rotor, and FIG. 3 is an exploded view illustrating the rotor illustrated in FIG. 2.

Referring to FIGS. 2 and 3, the rotor 10 may include the rotor holder 100, the magnet 200, and the sleeve 300. It is assumed that a rotation center of the rotor holder 100, a rotation center of the magnet 200, and a rotation center of the sleeve 300 are coaxial. The rotation center is referred to as a center C in the drawings.

The rotor holder 100 may be a member having a pipe shape. The magnet 200 is disposed under the rotor holder 100. In addition, the sleeve 300 is disposed on the rotor holder 100. The sleeve 300 and the magnet 200 are coupled using the rotor holder 100. The rotor holder 100 is an injection molding part manufactured through an injection molding process.

FIG. 4 is a perspective view illustrating the rotor holder illustrated in FIG. 1, and FIG. 5 is a side cross-sectional view illustrating the rotor holder taken along line A-A of FIG. 4.

Referring to FIGS. 4 and 5, the rotor holder 100 includes first grooves 110, second grooves 120, and a serration part 130.

The first groove 110 is a groove to be coupled to the magnet 200. The first grooves 110 may be grooves formed due to first protrusions 220 of the magnet 200 during the injection molding process. A shape of the first groove 110 corresponds to a shape of the first protrusion 220 of the magnet 200. For example, the shape of the first groove 110 may be a "]" shape started from a lower surface of the rotor holder 100 and bent toward an inner side surface of the rotor holder 100.

The second groove 120 is a groove to be coupled to the sleeve 300. The second groove 120 may be disposed above the first groove 110. In addition, the second groove 120 has a concave shape in the inner side surface of the rotor holder 100 in a radius direction of the rotor holder 100. For example, the second groove 120 may be a region positioned between two protrusions 121 protruding from the inner side surface of the rotor holder 100.

The serration part 130 is disposed on an upper surface of the rotor holder 100. The serration part 130 has a convex-concave shape. The serration part 130 is engaged with an external device for setting a starting point.

FIG. 6 is a perspective view illustrating the magnet, and FIG. 7 is a cross-sectional view illustrating the magnet taken along line B-B of FIG. 6.

Referring to FIGS. 6 and 7, the magnet 200 includes a first body 210 and the first protrusions 220. The first body 210 has a ring shape. The first protrusion 220 protrudes from an upper surface of the first body 210 in an axial direction. The first protrusion 220 is disposed in the rotor holder 100. In addition, the first protrusions 220 may be provides as a plurality of first protrusions 220. The plurality of first protrusions 220 may be disposed along the upper surface of the first body 210 at constant distances. The first protrusions 220 may include first-first protrusions 221 and first-second protrusions 222.

The first-first protrusion 221 extends upward from the upper surface of the first body 210. In addition, the first-second protrusion 222 perpendicularly protrudes from the first-first protrusion 221. An overall shape of the first protrusion 220 may be a "⏋" shape. A thickness t1 of the first-first protrusion 221 may be less than a thickness t2 of the first body 210. This is to secure a contact surface between an outer side surface of the first protrusion 220 and the rotor holder 100.

FIG. 8 is a view illustrating a coupling state of the magnet and the rotor holder.

Referring to FIG. 8, after the injection molding process, the rotor holder 100 surrounds an upper surface 222a of the first protrusion 220 and a lower surface 222b and a side surface 222c (see FIG. 6) of the first-second protrusion 222. The first-second protrusion 222 protruding toward the center C restricts the rotor holder 100 and the magnet 200 in the axial direction. The rotor holder 100 is in contact with the outer side surface of the first protrusion 220 and the upper surface of the first body 210.

Meanwhile, an outer diameter D1 of the rotor holder 100 may be less than an outer diameter D2 of the magnet 200 on the basis of the center C. This is to prevent interference of the rotor holder 100 in the radius direction about the center C when the rotor 10 rotates.

FIG. 9 is a view illustrating the sleeve, and FIG. 10 is a bottom view illustrating a convex portion.

Referring to FIGS. 9 and 10, the sleeve 300 may include a second body 310 and a second protrusion 320. The second body 310 is formed of a metal material having a pipe shape. The second protrusion 320 is disposed to extend outward from a lower end of the second body 310. The second protrusion 320 is a protrusion to increase a coupling force with the rotor holder 100.

The second protrusion 320 may include first convex portions 321A and second convex portions 321B. A curvature radius R1 of the first convex portion 321A may be different from a curvature radius R2 of the second convex portion 321B. For example, the curvature radius R1 of the first convex portion 321A may be less than the curvature radius R2 of the second convex portion 321B. The first convex portion 321A is a portion inserted into the second groove 120 of the rotor holder 100 to prevent the sleeve 300 from rotating in a rotating direction. However, the second convex portion 321B is a portion preventing rotation of the sleeve 300 and also securing a space of a concave portion 322. Accordingly, the fact that the curvature radius R1 of the first convex portion 321A is less than the curvature radius R2 of the second convex portion 321B is functionally advantageous to prevent the rotation of the sleeve 300.

FIG. 11 is a view illustrating a state in which the first convex portion is engaged with second groove.

Referring to FIGS. 10 and 11, the first convex portion 321A is inserted into the second groove 120. When the first convex portion 321A is inserted into the second groove 120, the sleeve 300 and the rotor holder 100 are restricted to each other and slip is prevented therebetween. Meanwhile, the second convex portion 321B is disposed. The concave portion 322 having a concave shape is formed as an outer surface of the second convex portion 321B. The concave portion 322 may have a rectangular shape. A groove 140 is positioned at a position, which corresponds to the concave portion 322, of the rotor holder 100. The groove 140 may have a rectangular shape. A jig of an external device for setting a starting point may be inserted into the concave portion 322 and the groove 140.

FIG. 12 is a view illustrating a state in which the rotor holder, the magnet, and the sleeve are coupled.

Referring to FIG. 12, a part of the rotor holder 100 may be disposed on an upper surface of the convex portion 321 of the sleeve 300. For example, the part of the rotor holder 100 may cover the convex portion 321 like a region P of FIG. 12. Accordingly, the sleeve 300 may not move in the axial direction and may be fixed.

The sensing device 1 according to the embodiment may be disposed between the input shaft (not shown) and the output shaft (not shown) of the steering shaft.

FIG. 13 is an exploded perspective view illustrating a sensing device according to an embodiment. In this case, an x-direction refers to an axial direction, and a y-direction refers to a radial direction in FIG. 16. In addition, the axial direction is perpendicular to the radial direction.

Referring to FIG. 13, a sensing device 1 according to the embodiment may include a housing 1100 having a first housing 1200 and a second housing 1300, a stator 1400 disposed inside the housing 1100, a rotor 1500 disposed inside the stator 1400, and collectors 1600 and a sensing part 1700 disposed in the housing 1100. In this case, the stator 1400 may be connected to the output shaft, and the rotor 1500 may be connected to the input shaft, but the stator 1400 and the rotor 1500 are not necessarily limited thereto.

The housing 1100 may form an exterior of the sensing device 1.

The housing 1100 may include the first housing 1200 and the second housing 1300 coupled to have an accommodation space therebetween. In addition, the stator 1400, the rotor 1500, the collectors 1600, and the sensing part 1700 may be disposed in the accommodation space.

A first through hole 1211 through which the input shaft passes may be formed in the first housing 1200, and a second through hole 1311 through which the output shaft passes may be formed in the second housing 1300. In this case, the input shaft may be connected to a steering handle, and the output shaft may be connected to a side of a steering wheel.

The first housing 1200 may support the stator 1400 to be rotatable in the housing 1100.

FIG. 14 is a perspective view illustrating a first example of the first housing of the sensing device according to the embodiment, and FIG. 15 is a plan view illustrating the first example of the first housing of the sensing device according to the embodiment.

Referring to FIGS. 14 and 15, a first housing 1200 according to the first example may include a main body 1210, a sidewall portion 1220 protruding from an edge of the main body 1210 in an axial direction, and a protruding portion 1230 protruding from an inner surface 1212 of the main body 1210. In this case, the protruding portion 1230 may be in contact with a stator 1400. In this case, the main body 1210, the sidewall portion 1220, and the protruding portion 1230 may be integrally formed.

The main body 1210 and the sidewall portion 1220 form an exterior of the first housing 1200. In addition, the main body 1210 and the sidewall portion 1220 may be formed of a synthetic resin material.

The main body 1210 may include a first through hole 1211 and the inner surface 1212.

The input shaft may pass through the first through hole 1211 and may be connected to a rotor 1500.

The inner surface 1212 of the main body 1210 may include a first surface 1212a and a second surface 1212b. In addition, collectors 1600 may be disposed on the first surface 1212a. In this case, the first surface 1212a and the second surface 1212b of the inner surface 1212 may be distinguished by whether the collector 1600 is disposed thereon.

The sidewall portion 1220 is formed to protrude from the edge of the main body 1210 in the axial direction.

The sidewall portion 1220 prevents the stator 1400 from being moved in a radius direction.

In addition, coupling structures 1221 coupled to protrusions 1310 of a second housing 1300 may be formed on the sidewall portion 1220. In this case, the coupling structure 1221 includes a hole formed therein, and the protrusion 1310 is disposed in the hole.

The protruding portion 1230 may extend to protrude from the inner surface 1212 of the main body 1210 in the axial direction. In addition, contact surfaces 1231 of the protruding portion 1230 may be in surface contact with one surface of the stator 1400. In this case, a groove 1232 may be formed between the contact surfaces 1231. Accordingly, since an amount of surface contact of the contact surfaces 1231 are decreased due to the groove 1232, noise generated when the sensing device 1 is driven may be decreased. In this case, the groove 1232 may be formed to be spaced apart from one surface of the stator 1400.

Referring to FIGS. 14 and 15, the protruding portion 1230 may include a first protruding portion 1230a and a second protruding portion 1230b disposed outside the first protruding portion 1230a. In this case, the first protruding portion 1230a and the second protruding portion 1230b may be formed to protrude from the inner surface 1212 of the main body 1210 in the axial direction.

The first protruding portion 1230a may be disposed to be spaced apart from the second protruding portion 1230b in the radius direction. Accordingly, the groove 1232 may be formed between the first protruding portion 1230a and the second protruding portion 1230b.

The contact surface 1231 of the first protruding portion 1230a and the contact surface 1231 of the second protruding portion 1230b formed with the groove 1232 disposed therebetween may be in surface contact with one regions of stator rings 1430 of the stator 1400. Accordingly, movement of the stator 1400 can be minimized when the stator 1400 is rotated.

The first protruding portion 1230a and the second protruding portion 1230b may be formed to have a 'C' shape when viewed from above.

As illustrated in FIG. 15, one region of a first surface 1212a of the main body 1210 in which the collector 1600 is disposed is disposed between one side end and the other side end of the second protruding portion 1230b. Accordingly, one region of the collector 1600 is disposed between one side end and the other side end of the second protruding portion 1230b.

As illustrated in FIG. 15, a first angle θ1 may be formed between one side end and the other side end of the first protruding portion 1230a about a center C of the stator 1400. In addition, a second angle θ2 may be formed between one side end and the other side end of the second protruding portion 1230b about the center C of the stator 1400. The second angle θ2 is less than the first angle θ1. In this case, the center C of the stator 1400 may be a center C of the first through hole 1211.

Meanwhile, a width W2 of the groove 1232 may be 20 to 30% of the sum of a width W1 of the contact surface 1231 of the first protruding portion 1230a, the width W2 of the groove 1232, and a width W3 of the contact surface 1231 of the second protruding portion 1230b.

The width W2 of the groove 1232 may be 0.50 to 0.86 times the width W1 of the contact surface 1231 of the first protruding portion 1230a. For example, W1:W2 may be in the range of 1:0.50 to 0.86.

Accordingly, an amount of surface contact against the stator 1400 is decreased due to the groove 1232. In this case, the width W3 of the contact surface 1231 of the second protruding portion 1230b may be the same as the width W1 of the contact surface 1231 of the first protruding portion 1230a.

That is, when an amount of noise generated due to the stator 1400 and support stability of the stator 1400 by the contact surface 1231 are considered, the width W2 of the groove 1232 may be 0.50 to 0.86 times the width W1 of the contact surface 1231 of the first protruding portion 1230a.

Meanwhile, a lubrication member (not shown) may be applied onto each of the contact surface 1231 of the first protruding portion 1230a and the contact surface 1231 of the second protruding portion 1230b. Accordingly, the lubrication member may be disposed between the stator rings 1430 of the stator 1400.

The lubrication member further decreases noise generated when the stator 1400 is rotated. In this case, grease may be used as the lubrication member.

In addition, when the stator 1400 is rotated, the lubrication member does not drift due to the groove 1232 and is collected on the contact surfaces 1231.

FIG. 16 is a perspective view illustrating a second example of the first housing of the sensing device according to the embodiment, and FIG. 17 is a plan view illustrating the second example of the first housing of the sensing device according to the embodiment.

Hereinafter, when a first housing 1200a according to the second example is described, since components which are the same as those of the first housing 1200 according to the first example will be assigned to the same numerals, specific descriptions thereof will be omitted.

When the first housing 1200a according to the second example is compared with the first housing 1200 according to the first example, the first housing 1200a according to the second example differs therefrom in that a plurality of protrusions 1233 and 1234 disposed to be spaced apart from each other are respectively provided as a first protruding portion 1230a and a second protruding portion 1230b. Accordingly, since a volume of the first housing 1200a according to the second example is less than a volume of the first housing 1200 according to the first example, a material cost thereof can be reduced.

Referring to FIGS. 16 and 18, the first housing 1200a according to the second example may include a main body 1210, a sidewall portion 1220 protruding from an edge of the main body 1210 in an axial direction, and a protruding portion 1230 protruding from an inner surface 1212 of the main body 1210. In this case, the protruding portion 1230 may include the first protruding portion 1230a and the second protruding portion 1230b disposed outside the first protruding portion 1230a. In addition, since the first protruding portion 1230a is disposed to be spaced apart from the second protruding portion 1230b in a radius direction, a groove 1232 may be formed between the first protruding portion 1230a and the second protruding portion 1230b.

The first protruding portion 1230a may be the plurality of protrusions 1233 disposed to be spaced apart from each other in a circumferential direction about a center C. In this case, the protrusion 1233 of the first protruding portion 1230a may be referred to as a first protrusion to be distinguished from the protrusion 1234 of the second protruding portion 1230b.

The first protrusion 1233 may be formed to have an arc shape when viewed from above.

The second protruding portion 1230b may be the plurality of protrusions 1234 disposed to be spaced apart from each other in the circumferential direction about the center C. In this case, protrusion 1234 of the second protruding portion 1230b may be referred to as a second protrusion.

The second protrusion 1234 may be formed to have an arc shape when viewed from above.

Accordingly, a contact surface 1231 of the first protrusion 1233 and a contact surface 1231 of the second protrusion 1234 disposed with the groove 1232 disposed therebetween are in surface contact with one regions of stator rings 1430 of a stator 1400.

Meanwhile, inclined surfaces 1233a and 1234a may be respectively disposed on one ends of the protrusions 1233 and 1234.

Referring to FIG. 18, each of the inclined surfaces 1233a and 1234a may be formed to have a predetermined angle θ3 with respect to a lower surface 1232a of the groove 1232. Accordingly, a lubrication member may be applied on the contact surfaces 1231 of the protrusions 1233 and 1234 through the inclined surfaces 1233a and 1234a and the contact surfaces 1231 of the protrusions 1233 and 1234 disposed adjacent thereto.

In this case, edges at which the inclined surfaces 1233a and 1234a meet the contact surfaces 1231 of the protrusions 1233 and 1234 may be rounded.

The stator 1400 is disposed outside a rotor 1500. In this case, the stator 1400 is disposed inside a housing 1100.

Referring to FIG. 13, the stator 1400 may include a stator yoke 1410, a stator holder 1420 connected to the stator yoke 1410, and a pair of stator rings 1430 disposed to cover a part of the stator holder 1420.

The stator yoke 1410 may be formed to have a cylindrical shape. In addition, the stator yoke 1410 may be connected to the output shaft of a steering shaft. In this case, the output shaft may be connected to a power transmission structure at a side of a wheel. Accordingly, the stator 1400 is connected to and rotated with the output shaft.

In this case, the stator yoke 1410 may be formed of a metal material. However, the stator yoke 1410 is not necessarily limited thereto and may be formed of a material in consideration of a predetermined strength or more such that the output shaft is fixedly inserted thereinto.

The stator holder 1420 may be disposed on one side end portion of the stator yoke 1410. For example, the stator holder 1420 may be disposed on one side end portion of the stator yoke 1410 using an insert injection method using a synthetic resin such as a resin.

The stator rings 1430 may be fixedly disposed around the stator holder 1420. For example, the pair of stator rings 1430 disposed to face and be spaced apart from each other in the axial direction may be disposed around the stator holder 1420.

The stator rings 1430 may be provided as the pair of stator rings 1430. In this case, the stator ring 1430 may be formed of a metal material.

The stator ring 1430 may include a body 1431 having a ring shape, a plurality of teeth 1432 disposed to be spaced apart from each other along an inner circumferential surface of the body 1431, and protruding portions 1433 disposed to be spaced apart from each other along an outer circumferential surface of the body 1431. In this case, the teeth 1432 and the protruding portions 1433 may be formed to protrude in the same direction. In addition, the body 1431, the teeth 1432, and the protruding portions 1433 may be integrally formed.

The teeth 1432 may be formed to protrude from the inner circumferential surface of the body 1431 in the axial direction.

The protruding portions 1433 may be formed to protrude from the outer circumferential surface of the body 1431 in the axial direction.

The protruding portions 1433 may be fixed to an outer circumferential surface of the stator holder 1420 by caulking.

The rotor 1500 is disposed outside the stator 1400. The rotor 1500 is connected to an input shaft of the steering shaft. In this case, the input shaft may be a steering shaft connected to a handle of a vehicle.

The rotor 1500 may include a rotor yoke 1510 having a cylindrical shape and a magnet 1520 disposed on the rotor yoke 1510.

The input shaft is inserted into the rotor yoke 1510. In addition, the magnet 1520 may be disposed outside the rotor yoke 1510. The magnet 1520 may be fixedly attached or press-fitted onto an outer circumferential surface of the rotor yoke 1510.

A collector 1600 collects a flux of the stator 1400. In this case, the collector 1600 may be formed of a metal material and fixed in the housing 1100. For example, the collector 1600 may be disposed on a first surface 1212a of the main body 1210.

The collector 1600 may be disposed close to the stator ring 1430. In this case, the term "close to" may mean being disposed to be in contact with or be spaced a predetermined distance therefrom.

The collector 1600 may include a plate 1610 and legs 1620 extending to protrude from the plate 1610. In this case, one surface of the plate 1610 may be disposed on the first surface 1212a of the main body 1210.

A sensing part 1700 measures a magnetic field generated between the stator 1400 and the rotor 1500. The sensing part 1700 is connected to an electronic control unit (ECU) of a motor configured to supplement a steering force, calculates a torque on the basis of the measured magnetic field, and transmits the torque to the ECU.

The sensing part 1700 may include a circuit board 1710 and sensors 1720. In this case, the sensor 1720 may be disposed at a position corresponding to an end portion of the leg 1620 of the collector 1600.

The sensor 1720 disposed on the circuit board 1710 may detect a change in magnetic field. A Hall integrated circuit (IC) may be provided as the sensor. Accordingly, the sensor 1720 detects an amount of magnetization of the stator 1400 generated due to an electrical interaction between the magnet 1520 of the rotor 1500 and the stator 1400. In addition, the sensing device 1 may measure a torque on the basis of the detected amount of magnetization.

While the present invention has been shown and described with reference to the exemplary embodiments thereof, it will be understood by those skilled in the art that various changes in form and details may be made therein without departing from the spirit and scope of the invention as defined by the appended claims. In addition, it should be understood that differences related to modifications and changes fall within the scope of the present invention defined by the appended claims.

<Reference Numerals>

| | |
|---|---|
| 1: SENSING DEVICE | 10, 1500: ROTOR |
| 20, 1400: STATOR | 30: SENSOR MODULE |
| 100: ROTOR HOLDER | 110: FIRST GROOVE |
| 120: SECOND GROOVE | 200: MAGNET |
| 210: FIRST BODY | 220: FIRST PROTRUSION |

| <Reference Numerals> | |
|---|---|
| 300: SLEEVE | 310: SECOND BODY |
| 320: SECOND PROTRUSION | 1100: HOUSING |
| 200: FIRST HOUSING | 1230: PROTRUDING PORTION |
| 1230a: FIRST PROTRUDING PORTION | |
| 1230b: SECOND PROTRUDING PORTION | |
| 1231: CONTACT SURFACE | 1232: GROOVE |
| 1233, 1234: PROTRUSION | 1300: SECOND HOUSING |
| 1600: COLLECTOR | 1700: SENSING PART |

The invention claimed is:

1. A sensing device comprising:
a housing including a first housing and a second housing;
a stator disposed inside the housing;
a collector disposed in the housing; and
a rotor disposed inside the stator,
wherein the first housing includes a main body and a protruding portion protruding from an inner surface of the main body,
wherein the protruding portion includes contact surfaces in contact with one surface of the stator and a groove disposed between the contact surfaces and spaced apart from one surface of the stator,
wherein the protruding portion includes a first protruding portion and a second protruding portion disposed outside the first protruding portion,
wherein each of the first protruding portion and the second protruding portion includes one side end and an opposite side end spaced apart from the one side end, and
wherein the groove is disposed between the first protruding portion and the second protruding portion.

2. The sensing device of claim 1, wherein:
the inner surface includes a first surface and a second surface; and
one region of the first surface on which the collector is disposed is disposed between the one side end and the opposite side end of the second protruding portion.

3. The sensing device of claim 2, wherein:
a first angle (θ1) is formed between the one side end and the opposite side end of the first protruding portion about a center (C) of the stator;
a second angle (θ2) is formed between the one side end and the opposite side end of the second protruding portion about the center (C) of the stator; and
the second angle (θ2) is less than the first angle (θ1).

4. The sensing device of claim 1, wherein a width of the groove is 20 to 30% of a sum of a width (W1) of a contact surface of the first protruding portion, the width (W2) of the groove, and a width (W3) of a contact surface of the second protruding portion.

5. The sensing device of claim 4, wherein the width (W2) of the groove is 0.50 to 0.86 times the width (W1) of the first protruding portion.

6. The sensing device of claim 5, wherein the width (W1) of the first protruding portion is a same as the width (W3) of the second protruding portion.

7. The sensing device of claim 1, wherein each of the first protruding portion and the second protruding portion is formed to have a "C" shape.

8. The sensing device of claim 1, wherein each of the first protruding portion and the second protruding portion includes a plurality of protrusions disposed to be spaced apart from each other in a circumferential direction thereof.

9. The sensing device of claim 8, wherein an inclined surface is obliquely formed on one end of each protrusion of the plurality of protrusions with respect to a lower surface of the groove.

10. The sensing device of claim 9, wherein each protrusion is formed to have an arc shape when viewed from above.

11. The sensing device of claim 1, further comprising a lubrication member disposed on the contact surfaces.

12. The sensing device of claim 1, wherein the rotor includes a rotor holder and a magnet and a sleeve which are coupled to the rotor holder,
wherein the magnet includes a first body and a first protrusion protruding from the first body in an axial direction,
wherein the sleeve includes a second body and a second protrusion protruding outward from the second body, and
wherein the rotor holder includes a first groove in which the first protrusion is disposed.

13. The sensing device of claim 12, wherein the first protrusion includes:
a first-first protrusion extending upward from an upper surface of the magnet; and
a first-second protrusion protruding perpendicularly from the first-first protrusion.

14. The sensing device of claim 13, wherein a thickness of the first-first protrusion is less than a thickness of the first body of the magnet in a radius direction of the magnet.

15. The sensing device of claim 14, wherein the rotor holder surrounds an upper surface, a lower surface, and a side surface of the first-second protrusion.

16. The sensing device of claim 12, wherein a distance from an outer circumferential surface of the rotor holder to a center of the magnet is less than a distance from an outer circumferential surface of the magnet to the center of the magnet.

17. The sensing device of claim 12, wherein:
the second protrusion includes a plurality of convex portions; and
the plurality of convex portions include a first convex portion and a second convex portion of which curvatures are different.

18. The sensing device of claim 12, wherein a part of the rotor holder is disposed on an upper surface of a convex portion of the second protrusion.

19. The sensing device of claim 12, wherein:
the rotor holder includes a second groove in which the second protrusion is disposed;
the first groove has a shape corresponding to a shape of the first protrusion; and
the second groove has a shape corresponding to a shape of the second protrusion.

20. The sensing device of claim 12, wherein:
the sleeve and the magnet are coupled using the rotor holder; and
the rotor holder is an injection molding part.

* * * * *